United States Patent
Harishankar et al.

(10) Patent No.: US 9,906,420 B2
(45) Date of Patent: Feb. 27, 2018

(54) DYNAMIC BOUNDARY BASED MONITORING AND METERING

(71) Applicant: International Business Machines Corporation, Armonk, NY (US)

(72) Inventors: Raman Harishankar, Blacklick, OH (US); Sreekanth R. Iyer, Bangalore (IN); Nanjangud C. Narendra, Bangalore (IN); Gandhi Sivakumar, Bentleigh (AU)

(73) Assignee: International Business Machines Corporation, Armonk, NY (US)

( * ) Notice: Subject to any disclaimer, the term of this patent is extended or adjusted under 35 U.S.C. 154(b) by 169 days.

(21) Appl. No.: 14/578,832

(22) Filed: Dec. 22, 2014

(65) Prior Publication Data

US 2016/0182324 A1 Jun. 23, 2016

(51) Int. Cl.
| | |
|---|---|
| *H04L 12/26* | (2006.01) |
| *H04L 12/24* | (2006.01) |
| *G06F 9/50* | (2006.01) |
| *G06Q 10/06* | (2012.01) |
| *H04M 15/00* | (2006.01) |
| *H04W 4/24* | (2009.01) |

(52) U.S. Cl.
CPC .......... *H04L 43/062* (2013.01); *G06F 9/5072* (2013.01); *G06Q 10/063* (2013.01); *H04L 41/046* (2013.01); *H04L 43/12* (2013.01); *H04M 15/60* (2013.01); *H04W 4/24* (2013.01); *H04L 41/0213* (2013.01); *H04L 41/0233* (2013.01); *H04L 41/5096* (2013.01)

(58) Field of Classification Search
None
See application file for complete search history.

(56) References Cited

U.S. PATENT DOCUMENTS

| | | | |
|---|---|---|---|
| 6,138,249 A | 10/2000 | Nolet | |
| 7,849,196 B2 | 12/2010 | Gkantsidis et al. | |
| 8,612,599 B2 | 12/2013 | Tung et al. | |
| 9,202,239 B2 | 12/2015 | Van Biljon et al. | |
| 9,467,840 B2 | 10/2016 | Harishankar et al. | |
| 9,559,921 B2 | 1/2017 | Harishankar et al. | |
| 2002/0095496 A1* | 7/2002 | Antes | H04L 63/0272 709/225 |
| 2005/0198576 A1* | 9/2005 | Childress | G06F 11/324 715/736 |

(Continued)

OTHER PUBLICATIONS

List of IBM Patents or Patent Applications Treated as Related; Dated Aug. 24, 2016; 2 pages.

(Continued)

*Primary Examiner* — Azizul Choudhury
(74) *Attorney, Agent, or Firm* — Edward J. Wixted, III (57) ABSTRACT

In an approach for providing a dynamic boundary based approach for monitoring and metering, a processor provisions at least one agent to one or more network accessible resources, wherein the at least one agent is configured to allow for monitoring and metering. A processor provides at least one dynamic boundary for monitoring and metering. A processor receives information captured by the at least one agent provisioned to the one or more network accessible resources based on the dynamic boundary for monitoring and metering. A processor causes the information to be available for use.

3 Claims, 5 Drawing Sheets

(56) References Cited

U.S. PATENT DOCUMENTS

| | | | |
|---|---|---|---|
| 2007/0288554 A1* | 12/2007 | Komlenic | H04L 41/046 709/203 |
| 2009/0265473 A1 | 10/2009 | Hydrie et al. | |
| 2010/0188975 A1 | 7/2010 | Raleigh | |
| 2011/0016214 A1 | 1/2011 | Jackson | |
| 2011/0131316 A1 | 6/2011 | Ferris et al. | |
| 2011/0131335 A1 | 6/2011 | Spaltro et al. | |
| 2011/0131499 A1 | 6/2011 | Ferris et al. | |
| 2011/0145836 A1 | 6/2011 | Wheeler et al. | |
| 2011/0167469 A1 | 7/2011 | Letca et al. | |
| 2011/0289119 A1 | 11/2011 | Hu et al. | |
| 2012/0116937 A1 | 5/2012 | Van Biljon et al. | |
| 2012/0131194 A1 | 5/2012 | Morgan | |
| 2012/0197686 A1* | 8/2012 | Abu El Ata | G06Q 10/06393 705/7.39 |
| 2012/0226808 A1 | 9/2012 | Morgan | |
| 2012/0330711 A1 | 12/2012 | Jain et al. | |
| 2013/0060933 A1* | 3/2013 | Tung | G06F 11/3495 709/224 |
| 2013/0132854 A1* | 5/2013 | Raleigh | G06F 3/0482 715/738 |
| 2013/0185413 A1 | 6/2013 | Beaty et al. | |
| 2013/0339503 A1 | 12/2013 | Annamalaisami et al. | |
| 2016/0014038 A1 | 1/2016 | Thyagarajan et al. | |
| 2016/0352593 A1 | 12/2016 | Harishankar et al. | |

OTHER PUBLICATIONS

U.S. Appl. No. 15/240,533, filed Aug. 18, 2016, Entitled "Dynamic Boundary Based Monitoring and Metering".

Darmawan, et al; "IBM Tivoli Usage and Accounting Manager V7.1 Handbook".

EMC Solutions Group; "Virtualizing Microsoft Applications in a Multi-Tenancy Environment with VCE Vblock1"; Feb. 2012.

Gotze, et al; "A Model for Policy-based Automation of Usage Accounting across Multiple Cloud Infrastructures".

Goyal, et al; "Policy-based Event-driven Services-oriented Architecture for Cloud Services Operation & Management"; 2009 IEEE International Conference on Cloud Computing; IEEE Computer Society; Copyright 2009.

IBM; "Managing multiple IBM Systems Director Servers using hierarchial management"; Printed Sep. 25, 2014; <http://pic.dhe.ibm.com/infocenter/director/v6r2x/topic/com.ibm.direct>.

IBM; "SmartCloud Monitoring—Application Insight"; Printed Sep. 25, 2014; <http://www.ibm.com/developerworks/servicemanagement/apm/sim/>.

IBM; "IBM Tivoli Monitoring for Virtual Environments, Version 7.1"; Copyright 2012; Printed Sep. 25, 2014; <http://www-01.ibm.com/support/knowledgecenter/api/content/SS9U7>.

Natale; Development of a Standard Methodology for Converting SNMP MIBs to Resource Models for the SOA/Web Services Management Environment (MIB2RMDL); Mar. 21, 2007.

Oasis; "Web Services Distributed Management: Management of Web Services (WSDM-MOWS) 1.1"; Aug. 1, 2006; Printed Sep. 25, 2014; <http://docs.oasis-open.org/wsdm-mows-1.1-spec-os-01.htm>.

"Method for dynamically allocating a resource from the cloud network based on client's requirement taken into consideration the actual runtime usage of the resource using a policy driven approach"; ip.com; Publication date: Apr. 22, 20100; Printed Sep. 25, 2014; <https://priorart.ip.com/IPCOM/000195171>.

List of IBM Patents or Patent Applications Treated as Related, dated Mar. 29, 2016, 2 pages.

U.S. Appl. No. 15/083,355, filed Mar. 29, 2016, Entitled "Dynamic Boundary Based Monitoring and Metering".

Harishankar et al., "Dynamic Boundary Based Monitoring and Metering" U.S. Appl. No. 15/391,964, filed Dec. 28, 2016.

IBM List of IBM Patent Applications Treated as Related, Appendix P, dated Mar. 17, 2017, 2 pages.

* cited by examiner

DYNAMIC BOUNDARY BASED MONITORING AND METERING

BACKGROUND OF THE INVENTION

The present invention relates generally to the field of application performance management, and more particularly to a dynamic boundary based approach for monitoring and metering.

In the fields of information technology (IT) and systems management, application performance management (APM) is the monitoring and management of performance and availability of software applications. APM strives to detect and diagnose application performance problems to maintain an expected level of service. APM is the translation of information technology metrics into business meaning (i.e., value).

Software metering refers to several areas. First, software metering tracks and maintains software licenses. One needs to make sure that only the allowed number of licenses are in use, and, at the same time, that there are enough licenses for each use. The tracking can include monitoring of concurrent usage of software for real-time enforcement of license limits. Such license monitoring usually includes when a license needs to be updated due to version changes or when upgrades or rebates are possible. Second, software metering may include real-time monitoring of all (or selected) applications running on a computer or computers in order to detect unregistered or unlicensed software and prevent its execution, or limit its execution to within certain hours. The systems administrator can configure the software metering agent on each computer in the organization, for example, to prohibit the execution of gaming software, for example, between the hours of 9 A.M. and 5 P.M. Third, software metering may include fixed planning to allocate software usage to computers according to the policies an organization specifies and to maintain a record of usage and attempted usage. An organization can check out and check in licenses for mobile users and can also keep a record of all licenses in use. Fixed planning is often used when limited license counts are available to avoid violating strict license controls. Finally, software metering may include a method of software licensing where the licensed software automatically records how many times, or for how long, one or more functions in the software are used, and the user pays fees based on the actual usage (also known as pay-per-use).

One of the main functions of most software metering programs is to keep track of the software usage statistics within an organization. Software metering assists the IT departments in keeping track of licensed software, which is often from multiple software vendors. Desktop or network based software metering packages can provide an inventory of software, give details of all the software installed in the network with the total number of copies with the usage details of each software, and even track metrics of software use, such as: how often the software is used by a particular department, the peak times the software is being utilized, and what add-ons are being utilized with the software. The possible savings on the cost of renewing the licenses of rarely used programs can be well worth the cost of the software.

SUMMARY

Aspects of an embodiment of the present invention disclose a method, computer program product, and computing system for providing a dynamic boundary based approach for monitoring and metering. A processor provisions at least one agent to one or more network accessible resources, wherein the at least one agent is configured to allow for monitoring and metering. A processor provides at least one dynamic boundary for monitoring and metering. A processor receives information captured by the at least one agent provisioned to the one or more network accessible resources based on the dynamic boundary for monitoring and metering. A processor causes the information to be available for use.

DETAILED DESCRIPTION

In the current state of monitoring network elements and devices, there does not exist anything suitable for cloud-based environments. Two approaches used are tier-based and event-based. Tiered approach for monitoring is "bottom up." Bottom up means exposed data is collected by an agent that resides in the bottom layer and a manager polls or receives the data through traps from the agents, normally realized through open interfaces. On the other hand, event-based monitoring solutions perform monitoring by capturing the generated events based upon the configurations. Event-based monitoring is bottom up as well, but the implementation is complex—as the arbitrary events have to be captured and processed. Both of the above approaches have limitations and are unsuitable for cloud-based environments.

Cloud-based monitoring is based upon a dynamic resource model, which means the resources get augmented or shrunk based upon the need of the person(s) using the resources, thus monitoring components are required to be dynamic. Cloud-based billing requires various types of statistics to be launched and implemented effectively. Cloud-based environments require management based upon the user level granularity per tenant view of the elements; for example, the number of transactions which failed when the infrastructure or software was used by a particular user of the tenant. Cloud management software performs provisioning requests for monitoring at the logical partition (LPAR) level; however, the monitoring enabled through the software for virtual environments is SNMP-MIB II based, which is static and does not collect statistics at the user level for the tenant for combined usage both for monitoring and billing based upon the usage and other policies. An LPAR is a subset of computer's hardware resources, virtualized as a separate computer. In effect, a physical machine can be partitioned into multiple LPARs, each hosting a separate operating system. SNMP is short for Simple Network Management Protocol, which is an Internet-standard protocol for managing devices on Internet Protocol (IP) networks. Examples of devices that typically support SNMP include: routers; switches; servers; workstations; printers; and modem racks. SNMP is used mostly in network management systems to monitor network-attached devices for conditions that warrant administrative attention. MIB-II defines the second version of the Management Information Base for use with network management protocols in TCP/IP-based internets, such as SNMP. An MIB is a database used for managing the entities in a communications network.

Overall, monitoring and metering at various levels of hierarchy, i.e., resource statistics as a whole, resources statistics as a logical partition, resource statistics at tenant level, and resource statistics at user level, is not available through the current approaches.

Embodiments of the present invention recognize that a solution to the problem of finding a suitable approach to monitor and meter network elements and devices in a cloud-based environment is to enable robust monitoring of cloud-based environments by creating boundary aware metering following a top-down approach. The boundary-aware metering following a top-down approach will be explained in detail when discussing the Figures below.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
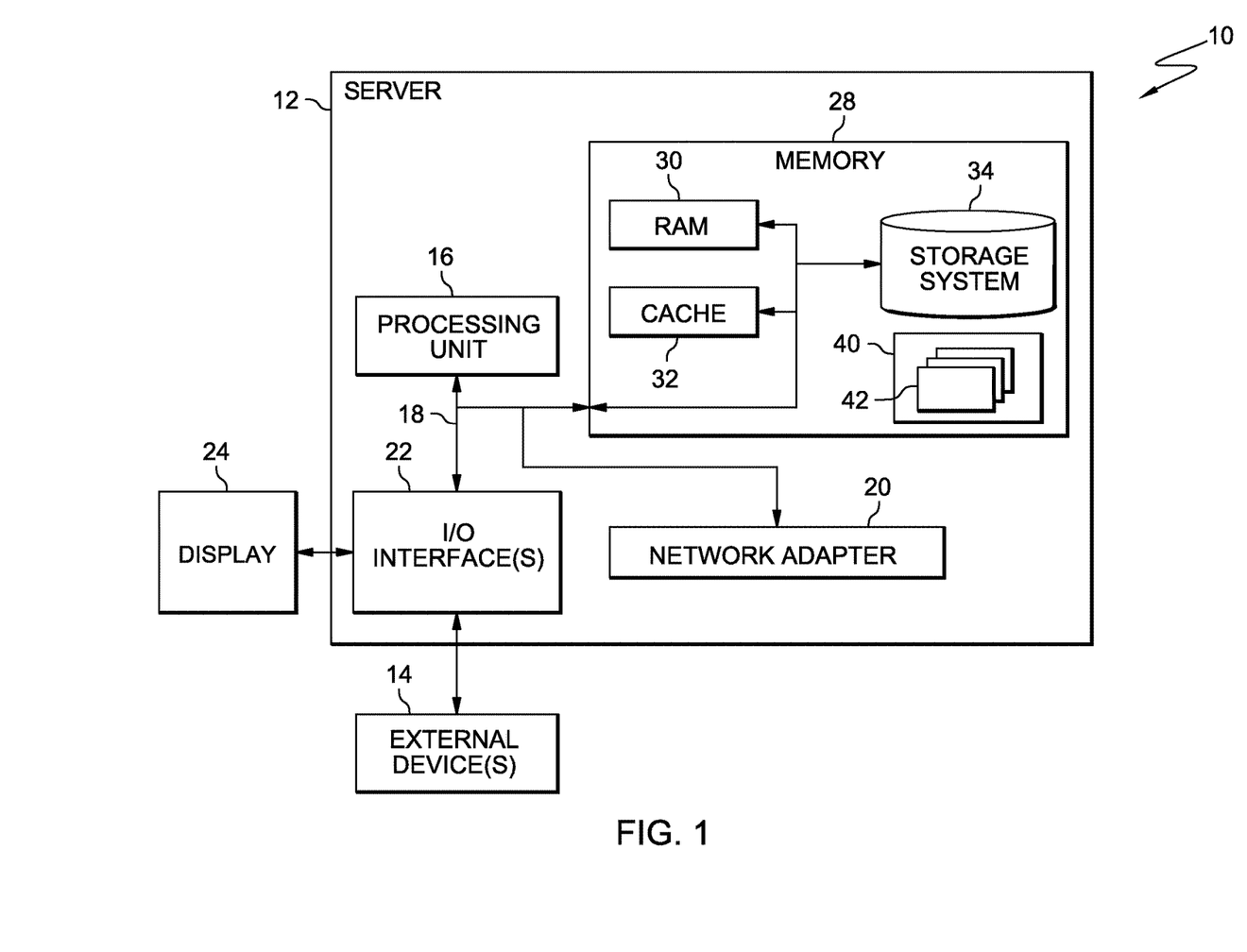
FIG. 1 depicts a cloud computing node according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a server 12, which is operational with numerous other general purpose or special purpose computing system environments or configurations.

Examples of well-known computing systems, environments, and/or configurations that may be suitable for use with server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Server 12 may be described in the general context of computer system-executable instructions, such as program modules, being executed by a computer system. Generally, program modules may include routines, programs, objects, components, logic, data structures, and so on that perform particular tasks or implement particular abstract data types. Server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, server 12 in cloud computing node 10 is shown in the form of a general-purpose computing device. The components of server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Server 12 typically includes a variety of computer system readable media. Such media may be any available media that is accessible by server 12, and it includes both volatile and non-volatile media, removable and non-removable media.

System memory 28 can include computer system readable media in the form of volatile memory, such as random access memory (RAM) 30 and/or cache memory 32. Server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Server 12 may also communicate with one or more external devices 14 such as a keyboard, a pointing device, a display 24, etc.; one or more devices that enable a user to interact with server 12; and/or any devices (e.g., network card, modem, etc.) that enable server 12 to communicate with one or more other computing devices. Such communication can occur via Input/Output (I/O) interfaces 22. Still yet, server 12 can communicate with one or more networks such as a local area network (LAN), a general wide area network (WAN), and/or a public network (e.g., the Internet) via network adapter 20. As depicted, network adapter 20 communicates with the other components of server 12 via bus 18. It should be understood that although not shown, other hardware and/or software components could be used in conjunction with server 12. Examples, include, but are not limited to: microcode, device drivers, redundant processing units, external disk drive arrays, RAID systems, tape drives, and data archival storage systems, etc.

Figure 2:
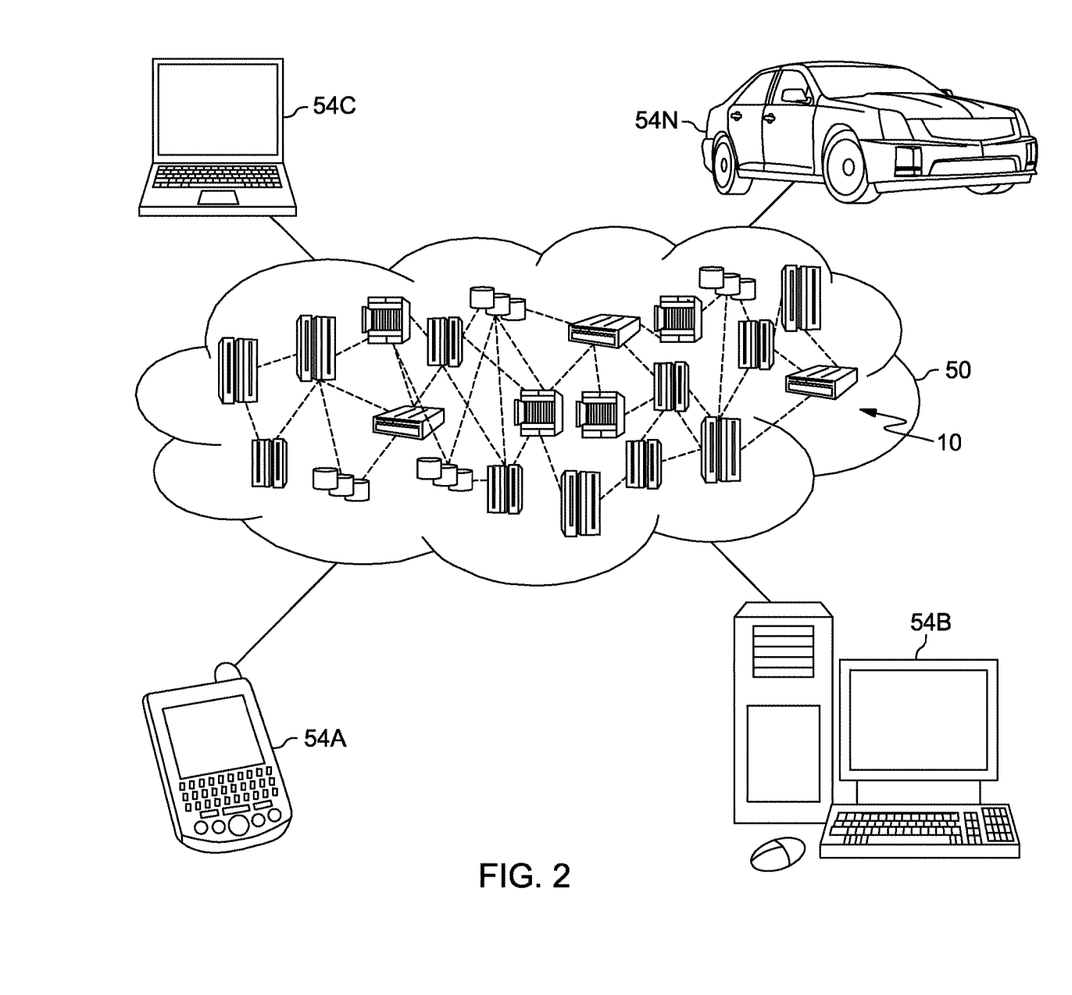
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
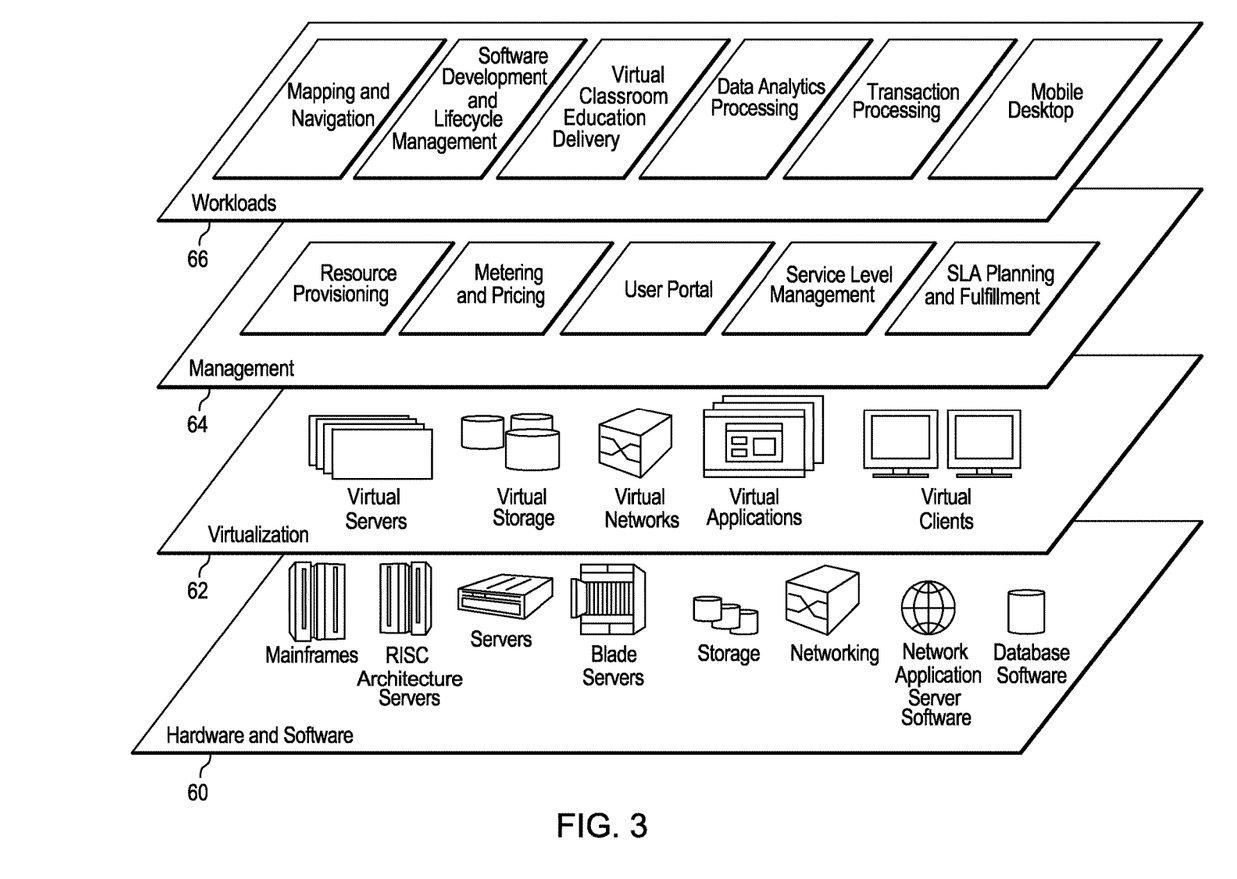
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes; RISC (Reduced Instruction Set Computer) architecture based servers; storage devices; networks; and networking components. In some embodiments, software components include network application server software.

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and mobile desktop.

Figure 4:
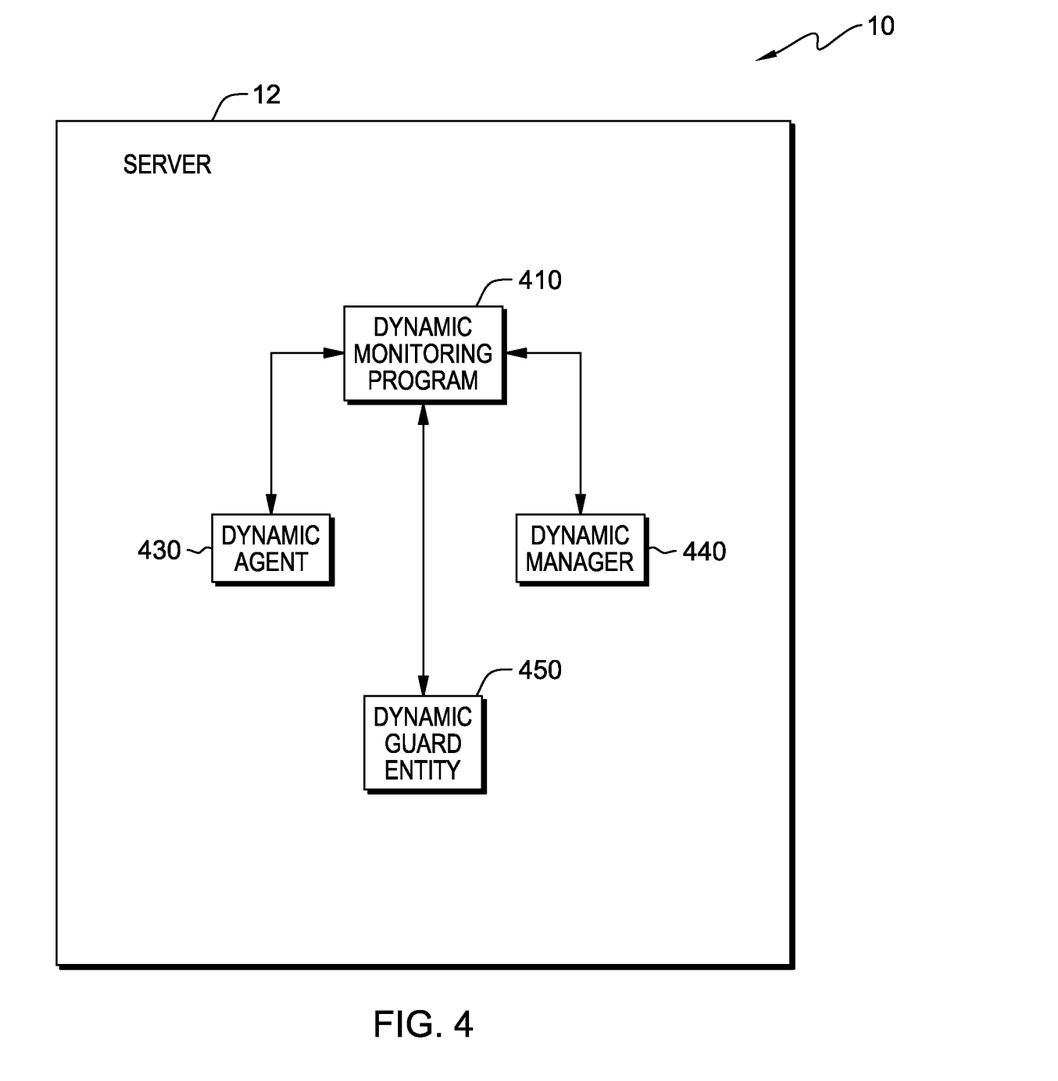
FIG. 4 depicts a block diagram of a computing system according to an embodiment of the present invention.

Referring now to FIG. 4, a diagram of a server 12 in cloud computing node 10 is shown, in accordance with one embodiment of the present invention. FIG. 4 provides an illustration of one embodiment and does not imply any limitations with regard to the environments in which different embodiments may be implemented.

In the depicted embodiment, server 12 contains dynamic monitoring program 410, dynamic agent 430, dynamic manager 440, and dynamic guard entity 450. Server 12 may include components as depicted and described in further detail with respect to FIG. 1.

Working within management layer 64 in FIG. 3, dynamic monitoring program 410 operates to provide a dynamic boundary based approach for monitoring and metering of cloud resources. Resources may include one or more of the following: networks, network bandwidth, servers, processing, memory, storage, applications, virtual machines, and services. In some embodiments, dynamic monitoring program 410 may generate reports to address present issues to benefit users. In other embodiments, dynamic monitoring program 410 may store information for later use. Additionally, in one embodiment, dynamic monitoring program 410 configures and provisions dynamic agent 430 on cloud resources (e.g., server, network, storage, etc.) consumed by a user for a specific cloud service that needs to be monitored and/or metered. In some embodiments, dynamic monitoring program 410 configures and provisions a dynamic guard entity 450 for each dynamic agent 430. In general, dynamic monitoring program 410 may be any application or software that enables resources consumed by users to be monitored and metered. In the depicted embodiment, dynamic monitoring program 410 resides on server 12. In other embodiments, dynamic monitoring program 410, or similar programs, may reside on another server or another computing device, provided that dynamic monitoring program 410 has access to dynamic agent 430, dynamic manager 440, and dynamic guard entity 450 over any network.

Dynamic agent 430 operates within the network elements. In some embodiments, dynamic agent 430 collects data describing network equipment, for example, the number of packets received or dropped in a particular link. In the depicted embodiment, dynamic agent 430 resides on server 12. In other embodiments, dynamic agent 430, or similar agents, may reside on other computing devices accessible to dynamic monitoring program 410.

Dynamic manager 440 operates within the application elements. In some embodiments, dynamic manager 440 uses the data collected by dynamic agent 430 to generate reports, and appropriate alarms can be raised in cases of traffic congestion, link failures, etc. In the depicted embodiment, dynamic manager 440 resides on server 12. In other embodiments, dynamic manager 440, or similar managers, may reside on other computing devices accessible to dynamic monitoring program 410.

Dynamic guard entity 450 watches for inactive users and triggers dynamic monitoring program 410 to archive any relevant information for any inactive user. In some embodiments, dynamic guard entity 450 assists in the de-provisioning of the dynamic agent 430 for an inactive user. In the depicted embodiment, dynamic guard entity 450 resides on server 12. In other embodiments, dynamic guard entity 450, or similar guard entities, may reside on other computing devices accessible to dynamic monitoring program 410.

Figure 5:
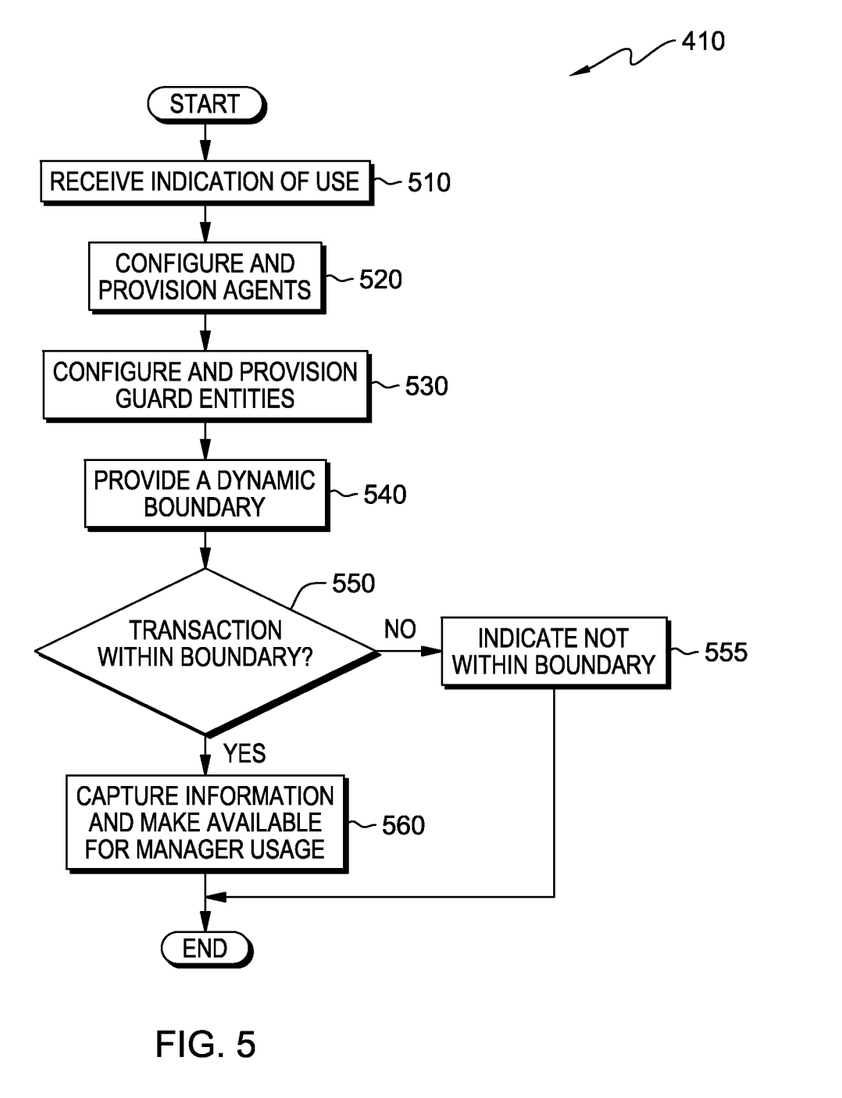
FIG. 5 depicts a flowchart of the steps of a dynamic monitoring program, executing within the computing system of FIG. 4, for providing a dynamic boundary based approach for monitoring and metering of cloud resources.

Referring now to FIG. 5, a flowchart of the steps of a dynamic monitoring program is shown, executing within the computing system of FIG. 4, in accordance with an embodiment of the present invention. Dynamic monitoring program 410 operates to provide a dynamic boundary based approach for metering of cloud resources, in accordance with one embodiment of the present invention. The boundary is used to determine what type of information needs to be monitored and metered. The term dynamic boundary refers to a boundary that is characterized by constant change, activity, or progress. Cloud-based environments are constantly changing; therefore, the boundary used has to be able to change as well.

The granularity required for monitoring and metering dynamic environments, such as a cloud environment, can be met using dynamic monitoring program 410. Dynamic monitoring program 410 provides a graphical user interface (GUI) to enable a cloud administrator to add new users for each tenant to be monitored and metered, in accordance with cloud services. Dynamic monitoring program 410 involves monitoring and metering agents that are now boundary aware and follows a top-down approach. A top-down approach is, essentially, the breaking down of a system to gain insight into the system's compositional sub-systems. A top-down approach measures the transit of traffic from user request to data and back again—part of capturing the end-user-experience (EUE). The outcome is referred to as Real-time Application monitoring (or top-down monitoring).

Initially, the cloud administrator configures and provisions resources to be ready for service use for upcoming tenants. In general, provisioning means providing or making available. In step 510, dynamic monitoring program 410 receives an indication of use. In one embodiment, dynamic monitoring program 410 receives an indication of use from a client computing device. In other embodiments, dynamic monitoring program 410 receives an indication of use from a configured resource.

In step 520, dynamic monitoring program 410 configures and provisions agents. Once a resource is provisioned by the cloud administrator and users of the tenant start to consume the service hosted by the tenant, dynamic monitoring program 410 triggers the provisions dynamic agents 430 on cloud resources (e.g., server, network, storage, etc.) consumed by a user for a specific cloud service that needs to be monitored and/or metered by dynamic manager 440. The same dynamic agent 430 can be used by the dynamic managers 440 for monitoring and billing at the user level for every tenant. When an additional user for the same tenant is added as a consumer to the cloud service, dynamic agent 430 is updated to keep the counter for the new user. Each user has a counter within dynamic agent 430. When the active users for a particular resource become zero (no longer any active users), dynamic agent 430 is de-provisioned after concurrence from the cloud administrator. In one embodiment, active users for a particular resource become zero when there are no longer any users consuming the particular resource. In other embodiments, active users for a particular resource become zero when the license purchased by the user expires.

In step 530, dynamic monitoring program 410 configures and provisions guard entities on cloud resources. Dynamic guard entity 450 monitors cloud computing resources for inactive users and triggers dynamic monitoring program 410 to archive relevant information for an inactive user. In addition to archiving relevant information, dynamic monitoring program 410 also de-provisions the counter for the inactive user in the respective dynamic agent 430. Dynamic monitoring program 410 also provides a means to configure dynamic guard entity 450 for each dynamic agent 430 to capture the information associated with a specific user, or group of users, for a specific period of time. If the user, for example, switches the billing plan from a "resource usage based charge back model" to a "fixed cost model based on allocation," then, as per the policy, dynamic guard entity 450 triggers dynamic monitoring program 410 to de-provision the user's counter from dynamic agent 430.

In step 540, dynamic monitoring program 410 provides a dynamic boundary. Each dynamic agent 430 is optimized to manage multiple monitoring and metering boundaries. In one embodiment, dynamic monitoring program 410 provides a dynamic boundary for monitoring and metering that can be set on dynamic agent 430 by dynamic manager 440. In other embodiments, users can define the boundary to be monitored and metered, which can have multiple parameters. For example, Boundary 1 could monitor the resources for tenant 1; user 1, 2, and 3; cloud resource (partition 1), i.e., Boundary n=F(tenant, user, resource, other parameters). Users can also create dynamic composite boundaries for monitoring and metering based on requirement, i.e., Boundary n=S(Boundary 1 . . . n). The dynamic composite boundary has at least two parameters and those parameters identify at least two dynamic boundaries. For example, users can create an application boundary, combining the boundaries defined for each component of the application; Boundary (business application)=Set(Boundary(database)+Boundary (application server)).

The dynamic boundary can be set, and object identifiers (OIDs) provisioned, at various levels of hierarchy, i.e., resource statistics as a whole, resources statistics as a logical partition, resource statistics at tenant level, and resource statistics at user level, thus enabling monitoring and metering at various levels of abstraction. OIDs are identifiers used to name an object. Structurally, an OID consists of a node in a hierarchically-assigned namespace. In computer networking, an OID, in the context of the Simple Network Management Protocol (SNMP), may be the object identifier for an object in a Management Information Base (MIB). A boundary can have many parameters, and each parameter has a counter. In order for one or more parameters to be monitored, the counters get incremented. The present invention can be implemented using traditional SNMP, Common Object Request Broker Architecture (CORBA), or any other proprietary interface. CORBA is a standard, defined by the Object Management Group (OMG), designed to facilitate the communication of systems that are deployed on diverse platforms and enables collaboration between systems on different operating systems, programming languages, and computing hardware. Boundaries and appropriate OIDs are augmented/deprecated by dynamic monitoring program 410, depending on a new user or a dormant (inactive) user.

In decision 550, dynamic monitoring program 410 determines whether a transaction is within the boundary. To determine whether a transaction is within the boundary, dynamic monitoring program 410 uses dynamic agent 430 to intercept the transaction and evaluate the transaction to determine if the transaction falls within dynamic agent's 430 boundary. If dynamic agent's 430 evaluation returns false, that the transaction does not fall within dynamic agent's 430 boundary (decision 550, no branch), there is an indication not within boundary and the resource usage is not monitored and metered (step 555).

In step 555, dynamic monitoring program 410 receives a response from dynamic agent 430, indicating the transaction is not within dynamic agent's 430 boundary. If dynamic agent's 430 evaluation returns true, that the transaction does fall within dynamic agent's 430 boundary (decision 550, yes branch), the resource usage is monitored and metered and captured and made available for usage (step 560).

In step 560, dynamic monitoring program 410 receives a response from dynamic agent 430, indicating the transaction is within dynamic agent's 430 boundary. Dynamic agent 430 captures and collects information (e.g., statistics) and makes available for dynamic manager 440 usage. As tenants and users start consuming the resources, dynamic agent 430 captures and collects the information at that level. In some embodiments, the captured statistical information is used by dynamic manager 440 to generate reports for monitoring and management in real-time at the user level, thus proactively addressing issues and applying policies for providing benefits to users.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for providing a dynamic boundary based approach for monitoring and metering, the method comprising:
provisioning, by one or more processors, at least one agent to one or more network accessible resources, wherein the at least one agent is configured to allow for monitoring and metering, and wherein the at least one agent is optimized to manage the plurality of individual dynamic boundaries;
provisioning, by one or more processors, at least one entity to the one or more network accessible resources, wherein the at least one entity is configured to monitor the one or more network accessible resources for inactive users, and wherein the at least one entity is further configured to trigger archival of information for an inactive user captured by the at least one agent;

providing, by one or more processors, at least one dynamic boundary for monitoring and metering, wherein the at least one dynamic boundary follows a top-down approach, wherein the top-down approach is a breaking down of a system to gain insight into the system's compositional sub-systems, and wherein the top down approach measures a transit of traffic from a user request to data and data back to the requesting user, and wherein the at least one dynamic boundary comprises a plurality of individual dynamic boundaries, and;
    wherein the at least one dynamic boundary has at least one parameter, wherein the at least one parameter identifies at least a user, and wherein the at least one parameter has at least one counter for the at least one agent, and
    wherein the at least one dynamic boundary is a dynamic composite boundary, wherein the dynamic composite boundary has at least two parameters, wherein the at least two parameters identify at least two additional dynamic boundaries;
provisioning, by one or more processors, object identifiers at levels of hierarchy, wherein the object identifiers allow, at the levels of hierarchy, for resource statistics as a whole, resource statistics as a logical partition, resource statistics at the tenant level, and resource statistics at the user level for the one or more network accessible resources;
receiving, by one or more processors, information captured by the at least one agent provisioned to the one or more network accessible resources based on the dynamic boundary for monitoring and metering;
generating, by one or more processors, reports for monitoring and management in real-time at the user level to address issues and apply policies to provide benefits to users within a network, based on the at least one agent, the dynamic boundary, and the object identifiers being manipulated, structurally, for the addition and subtraction of the user from the network; and
causing, by one or more processors, the information to be available for use.

2. A computer program product for providing a dynamic boundary based approach for monitoring and metering, the computer program product comprising:
a computer readable storage medium having program instructions embodied therewith, the program instructions executed by a processor to cause the processor to perform a method comprising:
provisioning at least one agent to one or more network accessible resources, wherein the at least one agent is configured to allow for monitoring and metering, and wherein the at least one agent is optimized to manage the plurality of individual dynamic boundaries;
provisioning at least one entity to the one or more network accessible resources, wherein the at least one entity is configured to monitor the one or more network accessible resources for inactive users, and wherein the at least one entity is further configured to trigger archival of information for an inactive user captured by the at least one agent;
providing at least one dynamic boundary for monitoring and metering, wherein the at least one dynamic boundary follows a top-down approach, wherein the top-down approach is a breaking down of a system to gain insight into the system's compositional sub-systems, and wherein the top down approach measures a transit of traffic from a user request to data and data back to the requesting user, and wherein the at least one dynamic boundary comprises a plurality of individual dynamic boundaries, and;
    wherein the at least one dynamic boundary has at least one parameter, wherein the at least one parameter identifies at least a user, and wherein the at least one parameter has at least one counter for the at least one agent, and
    wherein the at least one dynamic boundary is a dynamic composite boundary, wherein the dynamic composite boundary has at least two parameters, wherein the at least two parameters identify at least two additional dynamic boundaries;
provisioning object identifiers at levels of hierarchy, wherein the object identifiers allow, at the levels of hierarchy, for resource statistics as a whole, resource statistics as a logical partition, resource statistics at the tenant level, and resource statistics at the user level for the one or more network accessible resources;
receiving information captured by the at least one agent provisioned to the one or more network accessible resources based on the dynamic boundary for monitoring and metering;
generating reports for monitoring and management in real-time at the user level to address issues and apply policies to provide benefits to users within a network, based on the at least one agent, the dynamic boundary, and the object identifiers being manipulated, structurally, for the addition and subtraction of the user from the network; and
causing the information to be available for use.

3. A computer system for providing a dynamic boundary based approach for monitoring and metering, the computer system comprising:
one or more computer processors and a computer readable storage medium having program instructions embodied therewith, the program instructions executed by a processor to cause the processor to perform a method comprising:
provisioning at least one agent to one or more network accessible resources, wherein the at least one agent is configured to allow for monitoring and metering, and wherein the at least one agent is optimized to manage the plurality of individual dynamic boundaries;
provisioning at least one entity to the one or more network accessible resources, wherein the at least one entity is configured to monitor the one or more network accessible resources for inactive users, and wherein the at least one entity is further configured to trigger archival of information for an inactive user captured by the at least one agent;
providing at least one dynamic boundary for monitoring and metering, wherein the at least one dynamic boundary follows a top-down approach, wherein the top-down approach is a breaking down of a system to gain insight into the system's compositional sub-systems, and wherein the top down approach measures a transit of traffic from a user request to data and data back to the requesting user, and wherein the at least one dynamic boundary comprises a plurality of individual dynamic boundaries, and;
    wherein the at least one dynamic boundary has at least one parameter, wherein the at least one parameter identifies at least a user, and wherein the at least one parameter has at least one counter for the at least one agent, and wherein the at least one dynamic boundary is a dynamic composite boundary, wherein the dynamic composite boundary has at least two parameters, wherein the at least two parameters identify at least two additional dynamic boundaries;

provisioning object identifiers at levels of hierarchy, wherein the object identifiers allow, at the levels of hierarchy, for resource statistics as a whole, resource statistics as a logical partition, resource statistics at the tenant level, and resource statistics at the user level for the one or more network accessible resources;

receiving information captured by the at least one agent provisioned to the one or more network accessible resources based on the dynamic boundary for monitoring and metering;

generating reports for monitoring and management in real-time at the user level to address issues and apply policies to provide benefits to users within a network, based on the at least one agent, the dynamic boundary, and the object identifiers being manipulated, structurally, for the addition and subtraction of the user from the network; and causing the information to be available for use.

\* \* \* \* \*